Patented Mar. 31, 1942

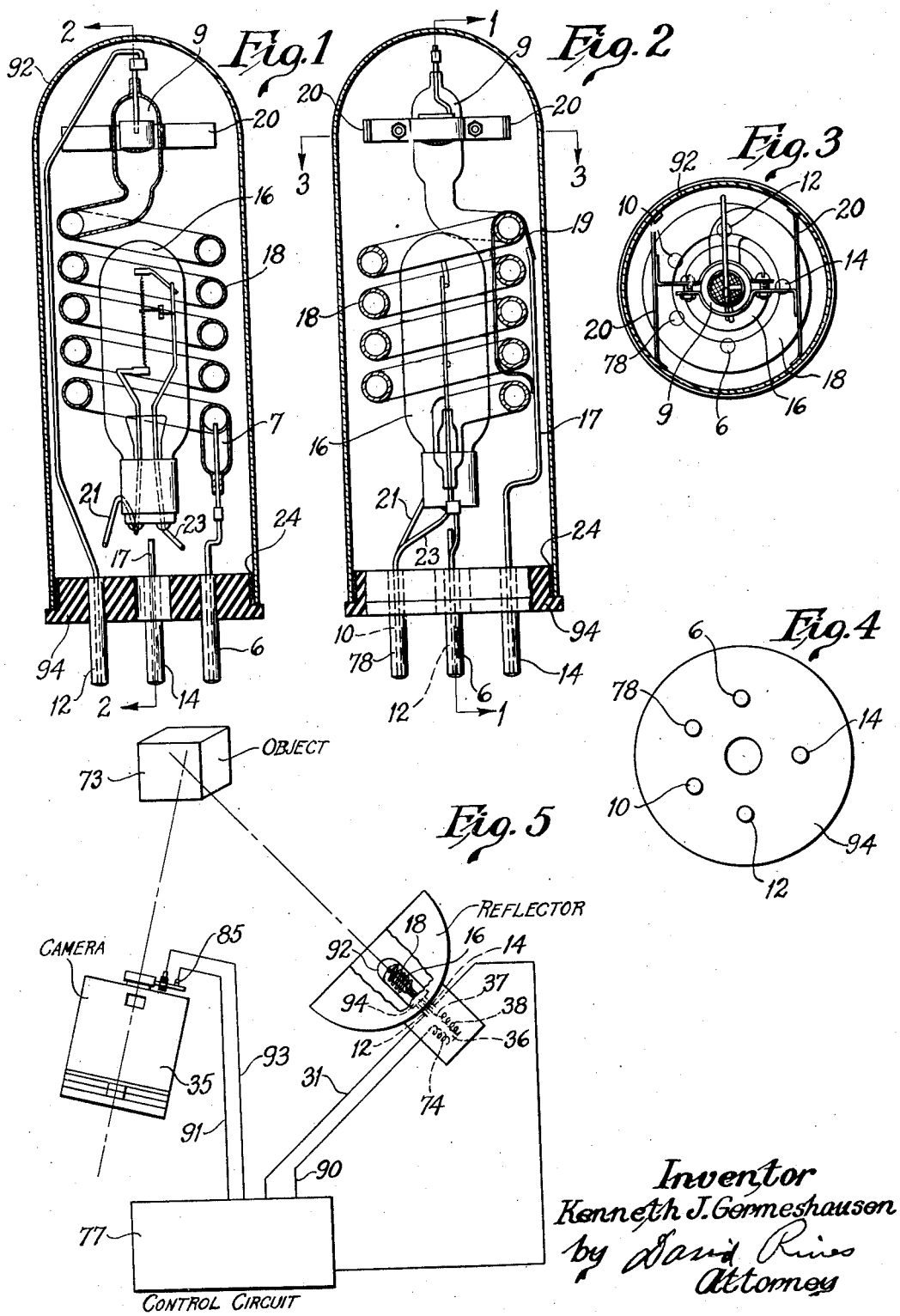

2,277,698

UNITED STATES PATENT OFFICE 2,277,698

FLASH-PHOTOGRAPHY APPARATUS

Kenneth Joseph Germeshausen, Cambridge, Mass., assignor to Herbert E. Grier, Newton Center, Mass.

Application May 13, 1941, Serial No. 393,235

8 Claims. (Cl. 176—1)

The present invention relates to electric systems and apparatus, and more particularly to systems and apparatus designed for flash photography.

In such systems, a gaseous-discharge flash-lamp is ordinarily employed to produce the exposure flash for illuminating the object to be photographed. The photographer trips the flash-lamp to produce the exposure flash at a time when satisfied, through observation, that the object to be photographed will yield the best results on the photographic plate or film. This observation the photographer makes with the aid of an incandescent lamp or other light-source prior to tripping the flash-lamp.

The location of the incandescent lamp or other light-source has heretofore been more or less haphazard. It has been rather common, for example, to position the incandescent lamp in one part of the room and the flash-lamp in another, these lamps thus directing their rays upon the object to be photographed from different directions. Under such circumstances, of course, the object will appear on the photographic film or plate under different light conditions from those under which the photographer viewed it with the aid of the incandescent lamp prior to the exposure flash. It frequently results, therefore, that the shades and shadows on the photograph are not what the photographer expected.

In a copending application, Serial No. 253,760, filed January 31, 1939, by Herbert E. Grier, the light-source and the flash-lamp are described as so positioned that their fields of illumination shall have approximately the same center. The light-source and the flash-lamp are combined in a single unit to constitute what may be termed a novel dual lamp. With the air of this dual lamp, the pre-view lighting and the photographing take place under almost identical conditions.

The flash-lamp of the said dual lamp produces a very brilliant flash for a very brief period of time. This renders it possible to employ a continuous very much weaker light-source that need not be extinguished during the exposure flash. Experience shows that, despite the brilliancy of the flash, it is not disturbing to the person to be photographed because of the shortness of its duration.

As further described in the said application, the novel dual lamp is provided with a common reflector so positioned relative to the flash-lamp and the light-source that the fields of illumination reflected therefrom upon the object to be photographed have approximately the same center. The high-voltage apparatus, as well as the light-source, moreover, are enclosed in an outside tube or bulb for protecting the operator from the high voltage.

An object of the present invention is to improve upon the dual lamp disclosed in the said Grier application, with the ends in view of providing a more effective and intense source of flashing light.

Other and further objects will be described hereinafter and will be particularly pointed out in the appended claims.

With these ends in view, a feature of the invention resides in employing a helical flash-lamp with the light-source so positioned in the helix that the fields of illumination of the flash-lamp and the light-source shall have approximately the same center.

The invention will now be described more fully in connection with the accompanying drawing, in which Fig. 1 is a longitudinal section of a dual lamp embodying the present invention, taken upon the line 1—1 of Fig. 2, looking in the direction of the arrows; Fig. 2 is a similar section, taken approximately upon the line 2—2 of Fig. 1, looking in the direction of the arrows, but showing the helical-coil flash-lamp in elevation; Fig. 3 is a horizontal section, taken upon the line 3—3 of Fig. 2, looking in the direction of the arrows; Fig. 4 is an underside plan; and Fig. 5 is a diagrammatic view illustrating a practical application of the invention.

As described in the said application, an elongated light-permeable glass-bulb jacket or envelope 92 may be provided, cemented at 24 to a flat insulating base 94 provided with five pin terminals 6, 10, 12, 14 and 78 projecting exteriorly thereof. The envelope 92 may be either clear or frosted; in the latter case, it will yield a better distribution of the light when used with conventional reflectors, such as the reflector shown in Fig. 5. In the envelope 92, a continuous modeling or guide-lamp light source, such as an incandescent lamp 16, is mounted within a helically coiled-tube flash-lamp 18, that may contain krypton or any other suitable gas. The helix is thus positioned around the incandescent lamp 16. The axis of the helical coil of the lamp 18 substantially coincides with, or is parallel to, the axis of the bulb 92. The flash-lamp 18 is provided with two terminals, constituted of a cathode 7 and an anode 9, connected, respectively, to the terminals 6 and 12. The parts are held permanently steady in correct position, and properly lined up, in the bulb 92, by means of suitable metal spreaders 20. One end of a high-voltage spark trigger or trip wire electrode 17 is connected to the terminal 14, and its other end is soldered or otherwise joined to one or both ends of a metal ribbon or band support 19 that is mounted over a plurality of the coils or turns of the helical-tube flash-lamp 18.

The lamp 16 is provided with terminals 21 and 23 that are respectively connected to the terminals 78 and 10. Two of the pin terminals 8, 10, 12, 14 and 78 are thus connected to the terminals 21 and 23 of the lamp 16, two to the cathode and the anode terminals 7 and 9 of the flash-lamp 18, and one to the trip wire 17.

The seal between the envelope 92 and the base 94 may be rendered gas-tight, in which event the incandescent lamp 16 may be replaced by an incandescent filament, and the whole envelope 92 could be evacuated.

The incandescent modelling or guide lamp 16 provides a continuous illumination for the purpose of focussing the reflector (shown in Fig. 5) upon an object or person 73, while pointing the reflector in the right direction; and then, with the parts set in this manner, as desired, a photograph of the object may be taken by a camera 35, with the aid of the flash-lamp 18. As the reflector has already been previously pointed, and the camera 35 has previously been focussed by means of the incandescent lamp 16, the light of the flash-lamp 18 will be certain to cover the area 73 that the camera has been focussed upon.

Because of the above-described relative locations of the light-source 16 and the flash-lamp 18 relative to the common reflector, with the axis of the reflector substantially coincident with, or parallel to, the substantially common axis of the lamps 16 and 18, the reflector thus produces reflected fields of illumination from the flash-lamp 18 and the light-source 16 that have approximately the same center. The illumination of the light-source 16 and of the flash-lamp 18 comes from exactly the same direction, and the same shades and shadows produced in the one case are produced in the other. A faithful preview is thus provided by the lamp 16 of the light balance that will appear in the photograph. The helical-coil flash-lamp construction is more advantageous than the U-shaped flash-lamp of the said Grier application, however, in that the light of the flash is radiated uniformly in all directions, and because it permits of a greater over-all length of tubing than does the U-shape, accompanied by better life and efficiency. The helical lamp, moreover, is more easily supported in the envelope 92.

Photographers rely upon the positioning of the lights to produce certain lighting effects. Without an incandescent modelling or guide lamp, the photographer can not study the lighting, and hence can not produce pictures that are lighted to the last advantage. The use of the incandescent modelling lamp 16, positioned so that its field of illumination shall have approximately the same center as that of the field of illumination of the flash-lamp 18, enables the photographer to place the lamps at a position that gives him the desired modelling and allows him to study the lighting at his leisure.

As explained in the said application, because the high voltage of the gaseous-discharge flash-lamp 18 is isolated by means of the glass jacket or envelope 92, however, so as to render the flash-lamp 18 harmless, no harm can come to either the operator or the object 73, and by operating the flash-lamp 18 during the illumination of the incandescent lamp 16, the startling flash may be rendered barely perceptible, without eye discomfort. No harm is produced by having the two lamps 16 and 18 on together during the brief interval of the flash because of the tremendously greater light produced by the flash-lamp compared with the light of the incandescent lamp 16. It is thus possible to carry out the work of flash photography with as little flash effect as possible upon the eyes of the person 73 being photographed. As further explained in the said application, the light from the incandescent lamp 16 helps to overcome the inertia of the film, thereby increasing the effective speed of the film to the flash-lamp 18. This, in effect, is prefogging the film to increase the sensitivity.

The bulb 92 containing the flash-lamp 18 and the incandescent lamp 16 may, however, be so positioned as to eliminate the necessity for employing the reflector; and the camera 35 may, furthermore, if desired, be focussed with the aid of auxiliary apparatus.

The apparatus may be used in conjunction with a control circuit 77, which may be of the nature more fully disclosed in the said application. The flash-lamp 18 may be connected, as there described, through the medium of the terminal pins 12 and 6, across a condenser (not shown herein), that may be subjected to a voltage of, say, 2000 volts from any direct-current supply (not shown). One side of the condenser (not shown) may be connected to the control circuit by a conductor 31. The lamp 16, too, is connected to some suitable source of power through the medium of the terminals 10 and 78. A primary winding 74 of a transformer 36 is connected to the control circuit 77 by way of a conductor 90. The secondary winding 38 of the transformer 36 is connected, by a conductor 37, to the trip wire 17 to produce the high-voltage triggering spark.

The flash-lamp 18 may be tripped by means of a hand-controlled switch (not shown), or, as illustrated and described in the said application, by means of an automatically operated contactor 85, that is connected to the control circuit 77 by way of conductors 91 and 93. The contactor 85 may be actuated by the object being photographed or, as shown, by the camera shutter.

As described in the said application, a voltage surge of the secondary winding 38 of the transformer 36 is applied to the trigger electrode 17 of tube 18. This causes the gas in the tube 18 to ionize, permitting the above-mentioned condenser (not shown) to discharge through the flash-lamp 18 between its electrodes, producing a very brilliant flash of short duration. The time taken for the circuit to function from the closing of the contactor 85 to the flash of light from the tube 18 is very brief. It is possible to produce this very brilliant flash of light for a very brief period of time at any desired instant for taking photographs. As the light-source 16 and the flash-lamp 18 are positioned so that their fields of illumination shall have approximately the same center, it is possible also to provide the auxiliary continuous lamp 16 in the same unit with the flash-lamp 18 so as to yield about the same light distribution from the reflector as would the flash-lamp 18 itself. Apparatus of this character is particularly useful in determining what part of the subject to be photographed is being illuminated; and also for focussing, once the desired distribution of light has been obtained. Further, if the contactor 85 is constructed in the camera shutter, and synchronized therewith, it is possible to expose the film for a brief interval to the incandescent light before the flash-lamp is fired. This exposure to the continuous light prefogs the film, thereby raising the sensitivity of the film to the subsequent flash.

Modifications will occur to persons skilled in the art and all such are considered to fall within the scope and spirit of the invention.

What is claimed is:

1. Apparatus for use in photography having, in combination, a helical flash-lamp for producing a very brilliant flash for a very brief period, and a light-source positioned in the helix of the flash-lamp so that the fields of illumination of the flash-lamp and the light-source shall have approximately the same center.

2. Apparatus for use in photography having, in combination, a helical flash-lamp for producing a very brilliant flash for a very brief period, and a light-source positioned in the helix of the flash-lamp, the helix of the flash-lamp and the light-source having substantially a common axis.

3. Apparatus for use in photography having, in combination, a helical flash-lamp for producing a very brilliant flash for a very brief period, a light-source positioned in the helix of the flash-lamp, and a common reflector for the light-source and the flash-lamp, the light-source and the flash-lamp being positioned relative to the reflector so that the reflected fields of illumination shall have approximately the same center.

4. Apparatus for use in photography having, in combination, a helical flash-lamp for producing a very brilliant flash for a very brief period, a light-source positioned in the helix of the flash-lamp, and a common reflector for the light-source and the flash lamp, the reflector having an axis, the helix of the flash-lamp and the light-source having substantially a common axis substantially coincident with, or parallel to, the reflector axis.

5. Apparatus for use in photography having, in combination, a helical flash-lamp for producing a very brilliant flash for a very brief period, a light-source positioned in the helix of the flash-lamp, and a light-permeable envelope in which the light-source and the flash-lamp are contained, the light-source and the flash-lamp being disposed in the envelope so that their fields of illumination shall have approximately the same center.

6. Apparatus for use in photography having, in combination, a high-voltage helical flash-lamp for producing a very brilliant flash for a very brief period, a light-source positioned in the helix of the flash-lamp, and a light-permeable portective envelope in which the light-source and the flash-lamp are contained to protect the operator from the high voltage of the flash-lamp without preventing the light of the flash from penetrating the envelope, the light-source and the flash-lamp being disposed in the envelope so that their fields of illumination shall have approximately the same center.

7. Apparatus for use in photography having, in combination, a high-voltage helical flash-lamp for producing a very brilliant flash for a very brief period, a light-source positioned in the helix of the flash-lamp, a high-voltage trigger wire for the flash-lamp, and a light-permeable protective envelope in which the light-source, the flash-lamp and the trigger wire are contained to protect the operator from the high-voltage of the flash-lamp and the trigger wire without preventing the light of the flash from penetrating the envelope, the light-source and the flash-lamp being disposed in the envelope so that their fields of illumination shall have approximately the same center.

8. Apparatus for use in photography having, in combination, a light-source, a flash-lamp for producing a very brilliant flash for a very brief period, and an evacuated light-permeable envelope in which the light-source and the flash-lamp are contained, the light-source and the flash-lamp being disposed in the envelope so that their fields of illumination shall have approximately the same center.

KENNETH J. GERMESHAUSEN.